United States Patent
Hermann

(10) Patent No.: US 6,225,707 B1
(45) Date of Patent: May 1, 2001

(54) FIRING CIRCUIT AND METHOD OF OPERATING THE CIRCUIT

(75) Inventor: Stefan Hermann, Köfering (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/591,302

(22) Filed: Jun. 9, 2000

Related U.S. Application Data

(63) Continuation of application No. PCT/DE98/03610, filed on Dec. 8, 1998.

(30) Foreign Application Priority Data

Dec. 9, 1997 (DE) ................................ 197 54 654

(51) Int. Cl.[7] .................................................. B60R 21/16
(52) U.S. Cl. ..................... 307/10.1; 280/735; 180/274
(58) Field of Search ................... 307/10.1; 280/735; 180/274

(56) References Cited

U.S. PATENT DOCUMENTS

| | | |
|---|---|---|
| 3,949,357 | 4/1976 | Hosaka . |
| 5,204,547 | 4/1993 | Schumacher et al. . |
| 5,522,617 * | 6/1996 | Swart .................................... 280/735 |
| 5,549,325 | 8/1996 | Kiribayashi et al. . |
| 5,554,890 | 9/1996 | Kinoshita . |
| 5,929,535 | 7/1999 | Fendt et al. . |

FOREIGN PATENT DOCUMENTS

| | | | |
|---|---|---|---|
| WO 89/02377 * | 3/1989 | (DE) | ............................. B60R/21/32 |
| 44 09 019 A1 | 9/1994 | (DE) . | |
| 196 24 357 C1 | 9/1997 | (DE) . | |
| 0 615 886 A1 | 9/1994 | (EP) . | |

* cited by examiner

Primary Examiner—Josie Ballato
Assistant Examiner—Robert L DeBeradinis
(74) Attorney, Agent, or Firm—Herbert L. Lerner; Laurence A. Greenberg; Werner H. Stemer

(57) ABSTRACT

In order to minimize the overall size of a firing capacitor and to minimize the energy which is not utilized during a firing operation, the firing capacitor charge voltage $U_0$ is set to be equal to $2*R*I$, where R designates the internal resistance of the firing cap and I designates the firing current. The capacitance value $C_0$ of the firing capacitor is set to $C_0=T/R$, where T designates the period for which the firing current flows.

6 Claims, 1 Drawing Sheet

FIRING CIRCUIT AND METHOD OF OPERATING THE CIRCUIT

CROSS-REFERENCE TO RELATED APPLICATION

This is a continuation of copending international application PCT/DE98/03610, filed Dec. 8, 1998, which designated the United States.

BACKGROUND OF THE INVENTION

FIELD OF THE INVENTION

The invention relates to a method for operating a firing circuit which is configured to actuate at least one firing cap of a firing system, in particular of a vehicle occupant protection system of a motor vehicle. The circuit has at least one firing capacitor for storing the energy necessary to fire the firing cap, and contains a switch which controls the connection between the at least one firing capacitor and the firing cap. The firing cap has a certain internal resistance and it requires, in order to be fired, a current which is at least as high as a predefined minimum current value for at least a specific minimum time period (T).

Firing circuits of this type are used to fire one or more firing caps when necessary, i.e., when it is desired that a pyrotechnic charge be ignited. Such firing circuits can generally be used to trigger explosive processes, but in the present invention they are preferably used in vehicle occupant protection systems of motor vehicles, in particular for securing systems, for example seat belt pretensioning systems or airbag systems.

U.S. Pat. No. 3,949,357 discloses a firing circuit in which the firing cap is arranged in series with two switches which are closed when the vehicle is subject to a collision. In other words, the switches serve as crash sensors. The firing circuit is fed by a battery which makes available the necessary firing energy.

U.S. Pat. No. 5,554,890 (German published patent application DE 44 09 019 A1) discloses a firing circuit that is provided with its own firing capacitor array which is charged to a predefined charge voltage during the normal operation of the motor vehicle, by a voltage or current generator which is fed from the motor vehicle battery. The firing capacitor array is composed in the simplest case of a single firing capacitor which is connected in parallel with the voltage or current generator, but it can also contain two or more firing capacitors which are connected in parallel or in series.

U.S. Pat. No. 5,929,535 (German patent DE 196 24 357 C1) discloses a firing circuit for an airbag in which either current is drawn from an energy accumulator in an unregulated fashion or in a regulated fashion with a regulated and limited output current mode.

The firing cap - also referred to as a squib - which is to be fired when the vehicle is in a collision is provided at the manufacturing end with specific specifications which define the minimum current value necessary for reliable firing and the minimum necessary period for which current must flow.

When the firing cap or firing caps have fired, there remains a residual quantity of energy which has not been consumed in the firing capacitor or capacitors. That residual quantity of energy cannot be utilized, but it makes it necessary for the firing capacitor or capacitors to be overdimensioned and thus be of a corresponding size.

SUMMARY OF THE INVENTION

The object of the invention is to provide an igniter circuit and a method of operating the same, which overcome the above-noted deficiencies and disadvantages of the prior art devices and methods of this kind, and which makes possible a compact design of the firing circuit, and good utilization of energy.

With the above and other objects in view there is provided, in accordance with the invention, a method of operating a firing circuit configured to actuate a firing cap of a firing system, such as trigger circuit in a motor vehicle occupant protection system. The firing circuit includes a firing capacitor for storing energy necessary to fire the firing cap, and a switch connected between the firing capacitor and the firing cap. The firing cap has a given internal resistance and is fired with a current having a value at least as high as a predefined minimum current value and a duration of at least a given minimum time period. The method comprises the following method steps:

charging the firing capacitor to a charge voltage of 2.0 to 2.4 times a product of the internal resistance of the firing cap and the current supplied to the firing cap during a firing operation;

limiting the current, during the firing operation, to a value corresponding to 1.0 to 1.2 times the minimum current value; and setting a capacitance of the firing capacitor to a capacitance value corresponding to 1.0 to 1.2 times the given minimum time period divided by the internal resistance of the firing cap.

With the above and other objects in view there is also provided, in accordance with the invention, a firing circuit for firing a firing cap having a predefined internal resistance and, for firing, requiring a supply of current having a value at least equal to a predefined minimum current value and a duration of at least a predefined minimum time period. The firing circuit comprises:

at least one firing capacitor;

a voltage or current source connected to and charging the firing capacitor to a specific charge voltage;

a switch for connecting the firing capacitor to the firing cap during a firing operation; and a current limiter limiting a current flowing to the firing cap during the firing operation to 1.0 to 1.2 times a minimum current value specified for the firing cap;

the firing capacitor having a charge voltage set to 2.0 to 2.4 times a product of the limited current flowing to the firing cap and an internal resistance of the firing cap; and the firing capacitor having a capacitance set to 1.0 to 1.2 times the minimum time period divided by the internal resistance of the firing cap.

In accordance with another feature of the invention, the current limiter is integrated into the switch.

The firing circuit outlined above permits particularly good utilization of firing energy and a compact circuit design.

In the invention, the current flowing into the firing cap (or firing caps) in the case of firing is limited to the minimum current necessary for the firing cap or to a current which is selected to be of a defined somewhat greater magnitude, and the charge voltage of the firing capacitor or capacitors is calculated as a function of the defined firing current and the internal resistance of the firing cap and set. Furthermore, the capacitance value of the firing capacitor or capacitors is calculated selectively as a function of the minimum period of current flow necessarily for the firing cap or caps, divided by the internal resistance of the firing cap or caps, and correspondingly dimensioned.

This procedure enables the energy which remains unused in the firing capacitor or capacitors after a firing operation and the energy which is consumed at the firing cap switch or in the current limiter to be selectively minimized. In this way, the method and the firing circuit are configured in such a way that the firing energy which is stored in the firing capacitor or capacitors is used for the firing procedure in an optimum fashion so that the capacitance value, and thus the magnitude of the firing capacitor or capacitors, can be set to an optimally small value. In this way, the utilization of energy and the charge voltage can be optimized and at the same time the dimensions of the firing circuit can be minimized owing to the use of a relatively small firing capacitor. The charge voltage and the capacitance value can be set here to the respective necessary minimum values. For safety reasons, it is, however, also possible to provide for the charge voltage and/or the capacitance value selected to have a safety threshold of, for example, 20%, preferably 10%, above the calculated values.

Other features which are considered as characteristic for the invention are set forth in the appended claims.

Although the invention is illustrated and described herein as embodied in a firing circuit and method for operating it, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
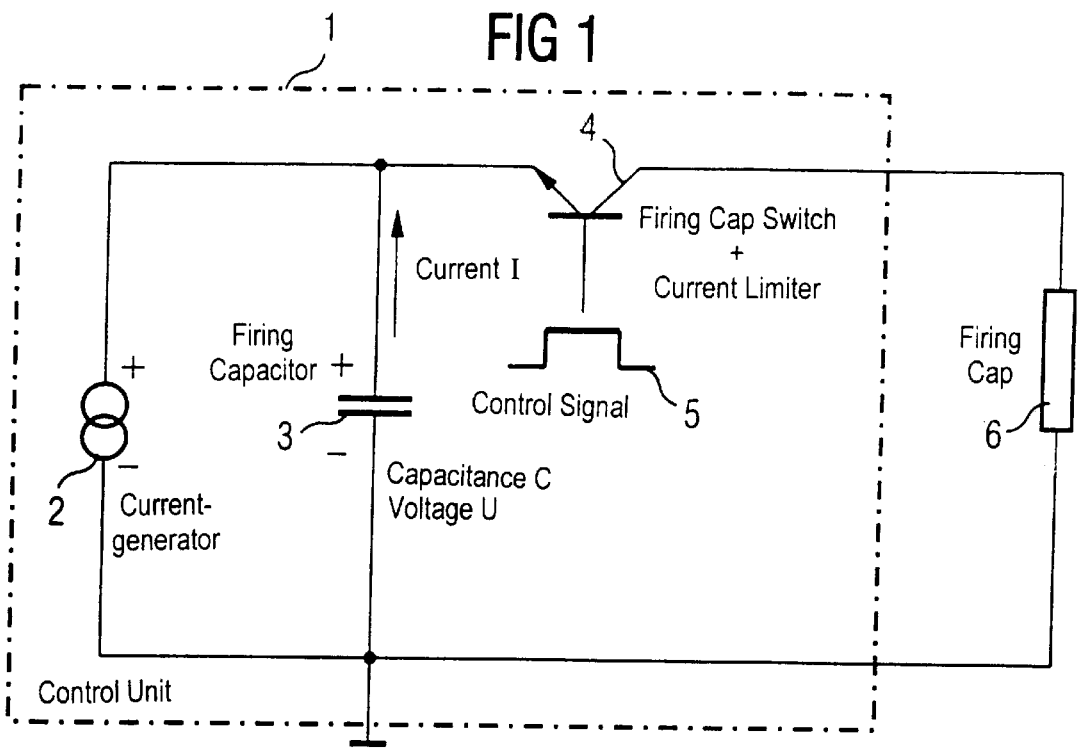
FIG. 1 is a schematic circuit diagram of an exemplary embodiment of the firing circuit according to the invention.

Referring now to the figures of the drawing in detail and first, particularly, to FIG. 1 thereof, there is seen a firing circuit which includes a control unit 1 which constitutes a component of a vehicle occupant protection system of a motor vehicle. The control unit 1 receives signals from one or more non-illustrated accident sensors which are strategically arranged in the motor vehicle. The control unit 1 is connected to the electrical system of the motor vehicle for its power supply. The signals of the accident sensors are evaluated with a microprocessor, which, if an accident is detected, activates a firing cap 6, connected to the control unit 1, of the vehicle occupant protection system. The firing cap 6, by way of example, is a squib of an airbag. Two or more firing cap 6 which are actuated by the control unit 1 on occasion of the hazardous situation can also be connected to the control unit 1.

The control unit 1 contains internally a current generator 2 which draws its input power from the electrical system of the motor vehicle. The current generator 2 charges a firing capacitor 3 connected to it in parallel to a predefined charge voltage. Instead of a current generator 2, a voltage generator may also be provided. Furthermore, in addition to the firing capacitor 3, it is possible also to provide one or more further firing capacitors which are connected in parallel to and/or in series with the firing capacitor 3. Provided in the line leading from the firing capacitor 3 to the firing cap 6 is a switch (firing cap switch) 4 which, when it is necessary to fire the firing cap 6, is switched on by the control unit 1 by a schematically illustrated, pulse-shaped control signal 5 which is applied to the base of the switch 4. The switch 4 is embodied as a transistor. The switch 4 is provided with a non-illustrated current limiter which may be embodied separately from the switch 4 or may be integrated in the switch 4. The current limiter can be equipped in the usual way and limits the current flowing to the firing cap 6. The current limiting value is preferably set directly to the current value which is predefined specifically for the firing cap by the manufacturer. The current limit value may be set to the minimum necessary for reliable firing (as specified by the manufacturer) or it may, for safety reasons, also be set to a relatively high value which is in the range of 1.0 to 1.2 times the minimum necessary current value, for example 1.1 times the value.

Generally, the energy stored in the firing capacitor or capacitors 3 rises proportionally with the capacitance of the firing capacitor and with the square of the applied charge voltage to which the firing capacitor is to be charged. Conventionally, the firing capacitors are therefore charged to the maximum possible voltage present in the circuit. In contrast to this, the invention makes available a method for optimized dimensioning of the capacitance value of the firing capacitor (or of the firing capacitors) 3 and of the charge voltage (starting voltage of the firing capacitor). Optimum values for the capacitance $C_0$ of the firing capacitor 3 and the charge voltage (starting voltage) $U_0$ of the firing capacitor 3 are determined as a function of the known firing cap resistance R, which is dependent on the firing cap, the current limiting value of the firing cap current (preferably the minimum required current) and the minimum period of current flow which is necessary for reliable firing and which is also predefined specifically for the firing cap.

Figure 2:
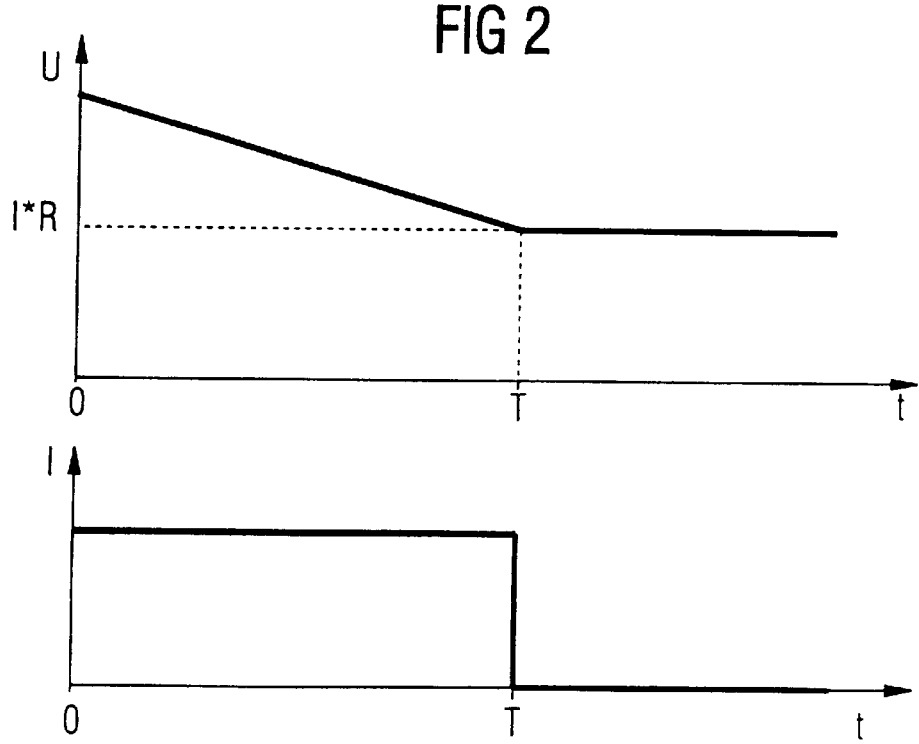
FIG. 2 is a graph showing a variation in the voltage and current during a firing procedure.

The upper half of FIG. 2 is a general illustration of the variation in the voltage at the firing capacitor 3 during a firing procedure. The time t is plotted on the abscissa and the voltage U of the firing capacitor 3 is plotted on the ordinate. The time t designates the minimum period of current flow necessary for reliable firing. The level "I*R" represents the voltage which is still present at the firing capacitor 3 after the firing procedure has been terminated. In the lower part of the curve, the variation in the firing current, and thus the capacitor current, is illustrated. As is clear, the current I is switched on at the time O (accident detection time) and is immediately limited to a constant current value, preferably the minimum necessary current value, and then flows constantly up to the time T, that is to say for the minimum necessary time interval. Then, it is switched off by opening the switch. The constant drawing off of current from the firing capacitor 3 leads to the linear drop (shown in the upper curve) of the capacitor voltage during the firing interval. The variation in the current over time which is shown in the lower part of the figure corresponds here to the variation in the voltage over time of the control signal 5 that is applied to the switch 4.

The following equations have been used as the basis for finding and setting the optimum values:

$$U = R*I + I*T/C \tag{1}$$

$$F = C*U^2/2 - R*I^2*T = minim \tag{2}$$

In equation (2), "$C*U^2/2$" designates the energy stored in the firing capacitor 3 at the beginning (before firing operation), whereas "$R*I^2*T$" designates the energy which is fed into the firing cap 6. The difference F is the energy which is not used for firing and which is consumed at the switch 4 (and/or at the current limiter) or remains stored in the firing capacitor 3. In order to determine the minimum value of F, this expression is differentiated (minimized) according to the voltage U so that the equation (3) which is given below and which is equivalent to the equations (1) and (2) is obtained:

$$dF/dU = \frac{(I*T*U)}{(U-R*I)^2} * (U - 2RI) = 0 \qquad (3)$$

The values for the charge voltage or start voltage $U_0$ and of the capacitance value $C_0$ of the firing capacitor 3 are calculated by means of equations (3) and (1):

$$U_0 = 2*R*I \text{ and } C_0 = T/R \qquad (4)$$

The optimum value of the charge voltage $U_0$ thus corresponds to twice the product of the resistance of the firing cap and (constant, current-limited) firing current I. The optimum, that is to say, smallest possible capacitance value $C_0$ of the firing capacitor 3 corresponds to the minimum period T of current flow divided by the resistance R of the firing cap. The values which are actually used for the charge voltage and the capacitance value in the firing circuit according to the invention preferably correspond directly to the values given, but, for safety reasons, slightly higher values may be selected, for example higher by up to 20%, preferably only up to 10% higher.

Thus, the minimum energy which is wasted in the firing circuit during a firing procedure, that is to say the energy which is not used for firing, is used as a criterion for calculating the optimum values for the capacitance and the charge voltage. The minimum capacitance value $C_0$ which is determined also leads at the same time to a firing capacitor with the smallest design so that the firing circuit as a whole can be configured in a very compact way. In addition, the power loss at the current-limiting switch 4 is also simultaneously minimized.

I claim:

1. A method of operating a firing circuit configured to actuate a firing cap of a firing system, the firing circuit including a firing capacitor for storing energy necessary to fire the firing cap, and a switch connected between the firing capacitor and the firing cap, and wherein the firing cap has a given internal resistance and is fired with a current having a value at least as high as a predefined minimum current value and a duration of at least a given minimum time period, the method comprising the following steps:

charging the firing capacitor to a charge voltage of 2.0 to 2.4 times a product of the internal resistance of the firing cap and the current supplied to the firing cap during a firing operation;

limiting the current, during the firing operation, to a value corresponding to 1.0 to 1.2 times the minimum current value; and setting a capacitance of the firing capacitor to a capacitance value corresponding to 1.0 to 1.2 times the given minimum time period divided by the internal resistance of the firing cap.

2. The method according to claim 1, which comprises operating the firing circuit as an integral member of a vehicle occupant protection system of a motor vehicle.

3. A firing circuit for firing a firing cap having a predefined internal resistance and, for firing, requiring a supply of current having a value at least equal to a predefined minimum current value and a duration of at least a predefined minimum time period, the firing circuit comprising:

at least one firing capacitor; p1 a voltage or current source connected to and charging said firing capacitor to a specific charge voltage;

a switch for connecting said firing capacitor to the firing cap during a firing operation; and a current limiter limiting a current flowing to the firing cap during the firing operation to 1.0 to 1.2 times a minimum current value specified for the firing cap;

said firing capacitor having a charge voltage set to 2.0 to 2.4 times a product of the limited current flowing to the firing cap and an internal resistance of the firing cap; and said firing capacitor having a capacitance set to 1.0 to 1.2 times the minimum time period divided by the internal resistance of the firing cap.

4. The firing circuit according to claim 3, wherein the current limiter is integrated into said switch.

5. In combination with a motor vehicle occupant protection system, the firing circuit according to claim 3.

6. The combination according to claim 5, wherein the firing cap is a squib of an airbag system and the firing circuit is a trigger circuit for the airbag system.

* * * * *